(12) United States Patent
Caron

(10) Patent No.: US 6,859,564 B2
(45) Date of Patent: Feb. 22, 2005

(54) SIGNAL PROCESSING USING THE SELF-DECONVOLVING DATA RECONSTRUCTION ALGORITHM

(75) Inventor: James Norbert Caron, Silver Spring, MD (US)

(73) Assignee: James N. Caron, Silver Springs, MD (US)

( * ) Notice: Subject to any disclaimer, the term of this patent is extended or adjusted under 35 U.S.C. 154(b) by 590 days.

(21) Appl. No.: 09/783,075

(22) Filed: Feb. 15, 2001

(65) Prior Publication Data

US 2002/0156821 A1 Oct. 24, 2002

(51) Int. Cl.[7] .................................................. G06K 9/40
(52) U.S. Cl. ..................................... 382/264; 382/280
(58) Field of Search ............................... 382/264, 260, 382/254, 280, 276, 275; 358/447, 461; 345/611

(56) References Cited

U.S. PATENT DOCUMENTS 5,729,631 A * 3/1998 Wober et al. ............... 382/232
5,974,194 A * 10/1999 Hirani et al. ............... 382/262

OTHER PUBLICATIONS

Yitzhaky et al "Identification of Motion Blur for Blind Image Restoration", Electrical and electronics Engineers in Israel, 1995, Eighteenth Convention of, Mar. 7–8, 1995–3.4.3.*

Yitzhaky et al "Evaluation of the Blur Parameters from Motion Blurred Images", Electrical and Electronics Engineers in Israel, 1996, Nineteenth Convention of Nov. 5–6, 1996, pps 216–219.*

Hadar et al "Restoration of Images Degraded by Mechanical Vibrations", Electrical and Electronics Engineers in Israel, 1995, Eighteenth Convention of Mar. 7–8, 1995–3.4.4.*

* cited by examiner

Primary Examiner—Yon J. Couso

(57) ABSTRACT

A signal processing algorithm has been developed in which a filter function is extracted from degraded data through mathematical operations. The filter function can then be used to restore much of the degraded content of the data through use of any deconvolution algorithm. This process can be performed without prior knowledge of the detection system, a technique known as blind deconvolution. The extraction process, designated Self-deconvolving Data Reconstruction Algorithm (SeDDaRA), has been used successfully to restore digitized photographs, digitized acoustic waveforms, and other forms of data. The process is non-iterative, computationally efficient, and requires little user input. Implementation is straight-forward, allowing inclusion into all types of signal processing software and hardware.

The novelty of the invention is the application of a power law and smoothing function to the degraded data in frequency space. Two methods for determining the value of the power law are discussed. The first method is by educated guess where the value is deemed a constant of frequency that ranges between zero and one. This approach requires no knowledge of the original data or the degradation and is quite effective. The second method compares the frequency spectrum of the degraded data to the spectrum of a signal with the desired frequency response. This approach produces a superior result, but requires additional processing.

12 Claims, 6 Drawing Sheets

Fig. 2C
Fig. 2D
Fig. 2E
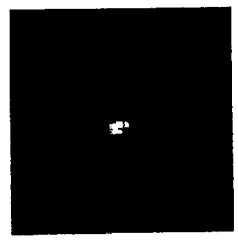

SIGNAL PROCESSING USING THE SELF-DECONVOLVING DATA RECONSTRUCTION ALGORITHM

GOVERNMENT INTERESTS

This invention was partly developed with U.S. Government support while performing research at the Naval Research Laboratory in Washington, D.C. The U.S. Government may have certain rights to this invention.

CROSS-REFERENCE TO RELATED APPLICATIONS

Disclosure document 480509 was filed with the USPTO on Sep. 29, 2000.

FIELD OF INVENTION

This invention relates to methods of signal processing whereby one desires to restore a signal that exhibits degradation, specifically to a process that identifies the degradation, providing the opportunity to restore the signal using a deconvolution algorithm.

SUMMARY OF THE INVENTION

A blind deconvolution process has been developed that requires no information about the degradation and little computation. The technique extracts a filter function from a signal or data set by application of a power law to the Fourier transform of the signal. The filter function is cleaned and inserted into a standard deconvolution process, potentially removing the aberration from the signal.

This process has several advantages over existing blind deconvolution techniques. The process is computationally efficient, requires only one iteration, and contains one significant parameter. The process is quick. The entire operation takes a few seconds to process a data set on a standard personal computer and could potentially process sound information in near real-time. The computer code is relatively simple, allowing easy implementation into existing signal and image processing programs. Most importantly, the results usually cannot be discerned from a restored signal where the degradation was known.

This process has many potential commercial applications. As will be shown here, degradations such as optics or motion blur, can be removed from digital (or digitized) images. Image processing programs can employ the algorithm alongside more common edge sharpening and median filters. Digitizing scanners can use it to counteract blurring effects created by their optics. The process can be embedded into digital oscilloscopes and data analyzers to bring out higher frequency components that are suppressed by certain low-pass filtering processes.

This process may also be embedded into circuitry. Communication lines may suffer from attenuation over long distances. By restoring degraded signals, the length of transmission may be extended. And as processors become smaller, they may find their way into household devices such as stereo systems and hearing aids. The algorithm could be implemented in these devices to enhance performance.

The novelty of this process is the Self-Deconvolving Data Reconstruction Algorithm (SeDDaRA). In SeDDaRA, a filter function is extracted from a degraded signal. A filter function is extracted from the data set that can be used to identify degradation and restore the signal. This document will describe SeDDaRA and the data restoration process. Since this method was developed as an image processing tool, application to two-dimensional data will be discussed in greater detail. However, the theory and application of this technique is equally as valid for one-dimensional data. This document will provide background, the known theory, current developments, alternative approaches, and the blind deconvolution process. Diverse examples will demonstrate the application and effectiveness of the procedure. Finally, a list of potential applications will be presented.

BACKGROUND

Prior Art

Signal reconstruction based on deconvolution has been thoroughly studied in recent decades. Some references for image reconstruction of note are listed in the references. [1, 2, 3] Some standard methods will be discussed in the following section. Blind deconvolutions are significantly more rare, although a sizable amount of research has been conducted recently. [4, 5, 6, 7, 8]

Several patents have been issued over the last decades that cover signal restoration processes. Generally, these methods are similar in that they attempt to identify the system degradation, and use a deconvolution algorithm to restore the signal as best as possible. The methods that have broad application include a blind deconvolution technique using maximum entropy, (Torkkola, U.S. Pat. No. 5,959,966, 1999) an iterative method for digital image restoration based on partial differential equations, (Carasso, U.S. Pat. No. 5,414,782, 1995) an iterative image restoration device based on noise minimization, (Carrington, U.S. Pat. No. 5,047,968, 1991) a noise filtering method using a Wiener variant filter, (Wober, U.S. Pat. No. 5,729,631, 1998) an apparatus for imaging and signal processing that establishes a figure of merit, (McCarthy, U.S. Pat. No. 6,014,468, 2000) and a method for restoring multiple frames using a Wiener filter. (Erdem, U.S. Pat. No. 5,550,935, 1996) Other methods have narrowly-defined applications. These include a method for blind restoration of radio signals, (Torkkola, U.S. Pat. No. 5,959,966, 1999) a method for removing blurs stemming from air turbulence in telescopes, (G. B. Rhoads, U.S. Pat. No. 6,084,227, 2000) a method that determines the impulse response from an interferometer, (Kulka-rni, et. al., U.S. Pat. No. 5,994,690, 1999) a method for removing noise from a video signal using a Wiener filter, (Kokaram, U.S. Pat. No. 5,500,685, 1996) a system for automatic processing of images using an interferometer system, (Kulkarni, U.S. Pat. No. 5,694,484, Dec.02, 1997) a method for the restoration of images disturbed by atmospheric conditions, (Kopeika, U.S. Pat. No. 5,841,911, 1998) and a method for the restoration of images degraded by mechanical vibrations (Kopeika, U.S. Pat. No. 5,790,709, 1998).

The process proposed here is distinct from these methods in its approach and simplicity. Many restoration algorithms require much computation and user intervention. SeDDaRA can be accomplished with a few lines of computer code, one iteration, and limited user input. Most processes above are limited in application and may not function well in the presence of noise. As will be shown, SeDDaRA can be applied in many situations and succeeds in the presence of noise.

Deconvolution Theory

The objective of data restoration, also referred to as reconstruction, is to remove a degradation from data that, with an ideal detection system, would not be there. If the form of the degradation is known, then a class of standard deconvolution algorithms can be used to remove it as best as possible. For images, this degradation could be caused by motion blur, a partially blocked aperture, or an improperly focused lens system. The blur function d(x, y), also known as a point spread function (PSF), is representative of how a distant point of light travels through the optical system. [1] The mathematical representation of the blurred image g(x, y) is a convolution $$g(x, y)=f(x, y)*d(x, y)+w(x, y) \quad (1)$$

where w(x, y) is a noise term, and * denotes the two-dimensional convolution. [1] The objective is to find the best estimate of f(x, y) from the noisy blurred image g(x, y) when d(x, y) is unknown. This relationship is simplified by transferring both sides of Equation 1 into frequency space via application of a Fourier transform. [9] This changes the convolution to multiplication, yielding $$G(u, v)=F(u, v)D(u, v)+W(u, v) \quad (2)$$

where u and v are the coordinates of frequency space, and the capital letters represent the images in Fourier space. (Although one could achieve similar results with other transforms, the Fourier transform is the most common.) For the following discussion, I will assume noise is negligible.

The term 'deconvolution' is used to describe a process that removes the PSF from the image. There exists a large assortment of deconvolution algorithms. [1] The inverse filter is the most simple. The solution is $$F(u, v) = \frac{G(u, v)}{D(u, v)}. \quad (3)$$

However, in most cases, the Fourier transform of the PSF D(u,v), also referred to as the optical transfer function (OTF), contains values that are very small. This results in a restored image f(x, y) that is dominated by noise.

To compensate for this, a constant is added to the denominator, $$F(u, v) = \frac{G(u, v)D*(u, v)}{|D(u, v)|^2 + K}, \quad (4)$$

which is known as the pseudo-inverse filter (PIF). [1] The parameter K is typically chosen by trial and error. A smaller value increases the restored resolution, but also increases the noise. If the parameter is set too high, the image will not have changed. This filter is easy to employ and works well with most images.

If a least-squares estimation is applied to Equation 2, the result is $$F(u, v) = \frac{G(u, v)D*(u, v)}{|D(u, v)|^2 + \frac{\sigma_N}{\sigma_S}} \quad (5)$$

where $\sigma_N$ is the power spectral density (PSD) of the image noise, and $\sigma_S$ is the PSD of F(u, v). (The PSD of a function A(u, v) is defined as $S_A(u) |A(u, v)|^2/NM$ where N and M are the dimensions of the image.) Equation 5 is known as the Wiener filter [10, 11, 12], named after Norbert Wiener. Since, F(u,v) is not known in empirical situations, $\sigma_S$ must be approximated.

There exists many other algorithms that are capable of producing deconvolutions when the PSF is known. Some of these are described in reference [2]. The application of these methods is typically narrow in scope, producing good results within certain restrictions.

These algorithms require knowledge of the PSF to perform. However, in many situations the PSF is not measurable or cannot be easily modeled. To overcome this, a range of solutions has been developed known as blind deconvolution algorithms. Blind deconvolution is a general term describing techniques that remove aberrations caused by some unwanted low-pass filtering technique where the PSF is not determined. Blind deconvolution techniques can be either iterative [4, 5, 6, 7] or non-iterative [8, 13]. Iterative techniques, which comprise of the majority of blind deconvolution techniques, are based on equations that require multiple applications. After many iterations, the program converges on a solution if the parameters are set correctly. As such, they generally require a significant amount of computation and can be difficult to implement. [13] Often, both classes require that at least a certain amount of information about the degradation be known.

An optimum algorithm would then be non-iterative, easy to implement, able to handle significant noise, and effectively operate on a large class of images. To the best of my knowledge, SeDDaRA is the first algorithm to meet such requirements.

BRIEF DESCRIPTION OF THE DRAWINGS

FIG. 2C shows the transform after the phase information is discarded, and a smoothing function applied.

FIG. 2D is the deconvolution of the image using the extracted point spread function, shown in FIG. 2E.

SeDDaRA THEORY

General Formulation

Figure 1:
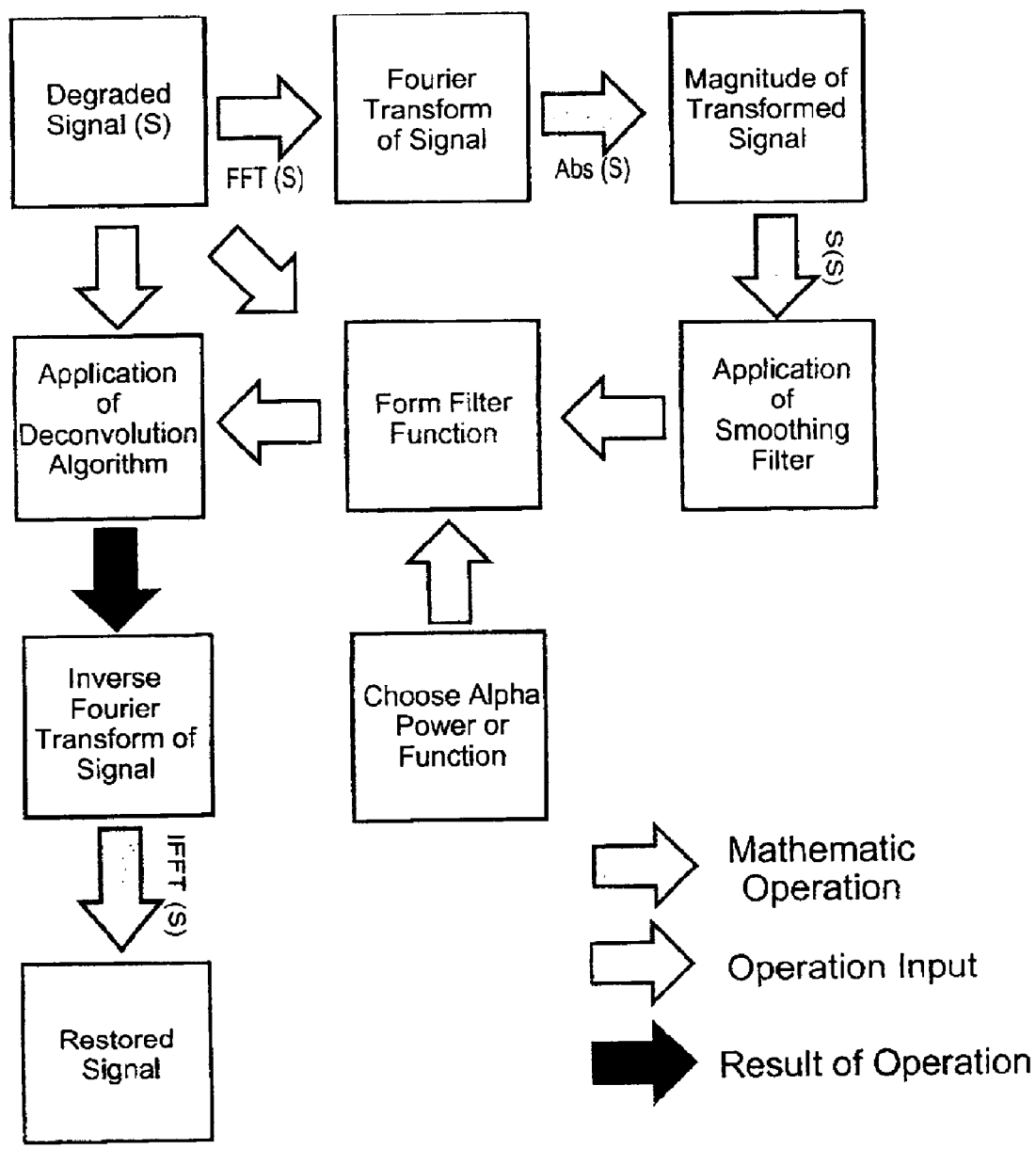
FIG. 1 is a flowchart showing the primary steps for the extraction of the filter function and the deconvolution of a data set.

The theoretical basis for the technique is still being studied. Although this work continues, a basic understanding has been established. Essentially, the process begins with Equation 2 where only G(u, v) is known. Using this process, D(u, v) is estimated and F(u, v) is found using a deconvolution algorithm. So, as a pure analytic calculation, there is one equation and two unknowns, and the process finds both. Mathematically this is impossible. In order for a blind deconvolution technique to work, some information about the either the original data or the PSF must be known.

Instead of estimating either function, SeDDaRA assumes that there is a relationship between the smoothed magnitude of the truth image and the PSF represented as $$D^{1-\alpha}(u, v)=K_D S\{F^\alpha(u, v)\} \quad (6)$$

where $S\{\ldots\}$ is a smoothing filter, and $K_D$ is a real, positive scalar to insure that $|D(u, v)|<1$. This equation is a statement that if all other quantities are known, there exists a function $\alpha(u, v)$ that shapes $D(u, v)$ into the form necessary for deconvolution. If this relation holds, then $D(u, v)$ can be determined from the scaled αth power of the smoothed magnitude of $G(u, v)$ and $W(v, v)$ using $$D(u, v) = K_D S\{|G(u, v) - W(u, v)|^\alpha\} \tag{7}$$

provided the degradation is space invariant. In other words, the PSF does not vary across the image plane. This is subject to the conditions that (i) $0 \leq \alpha < 1$, (ii) the smoothing filter $S\{\ldots\}$ is separable, (iii) $D(u, v)$ is real, and (iv) that $F(u, v)$ and $W(u, v)$ are uncorrelated. Equation 7 states that application of a smoothing filter and power law to the power spectrum of the truth image, when chosen correctly, will produce the degradation. Although stated as an equality here, in practice this is an approximation. Equation 7 is the primary innovation behind this blind deconvolution technique.

Equation 7 can be derived from Equation 6 by applying the stated conditions. Condition (i) guarantees that the exponent of $D(u, v)$ in Equation 6 is positive. If there is no degradation, then $\alpha = 0$. Equation 7 can be derived by rewriting Equation 4 as follows $$D(u, v) = K_D S\{F^\alpha(u, v)\} D^\alpha(u, v). \tag{8}$$

Since the spectrum of the transfer function is inherently smooth, Equation 8 can be stated as $$D(u, v) = K_D S\{F^\alpha(u, v)\} S\{D^\alpha(u, v)\}. \tag{9}$$

Condition (ii) allows the smoothing filter to be factored in and out of equations. Depending on the choice of filter, empirically this represents a certain level of approximation. For the purposes of this theoretical calculation, I will represent the condition as an exact relationship. Application of condition (ii) to Equation 9 produces $$D(u, v) = K_D S\{[F(u, v) D(u, v)]^\alpha\}. \tag{10}$$

Since the system is by definition linear and space-invariant, the relationship between the input and output spectra is $$|G(u, v) - W(u, v)| = F(u, v) D(u, v) \tag{11}$$

when condition (iv) is employed. Substitution of Equation 11 into Equation 10 produces $$D(u, v) = K_D S\{|G(u, v) - W(u, v)|^\alpha\} \tag{12}$$

which is Equation 6.

The filter function is derived from Equation 12 where α is a tuning parameter. The filter function is then inserted into a deconvolution algorithm, such as a Wiener filter, [10, 11, 12] to restore the image. To the best of my knowledge, any deconvolution algorithm can be used.

Note that Equation 12 also accounts for system noise. This allows the algorithm to work well in the presence of noise. Thus, for the purposes of this study, it is safe to assume that $W(u, v)$ is implied by use of $G(u, v)$.

Frequency-independent Alpha

The critical step is to determine the correct α function that will enable successful deconvolution of the image. Fortunately, in most cases, the function can be approximated as a constant of frequency. This limits choices to a single number that, according to condition (i), is $0 \leq \alpha < 1$. The parameter a can be determined by trial and error. In most cases, $\alpha = 0.5$ has proven to be an effective initial choice. Reconstruction quality does not significantly differ for variations less than ±0.05.

Frequency-dependent Alpha

To improve upon the results above, $a(u, v)$ can be calculated as a function of frequency. If the natural logarithm is taken on each side of Equation 4, one gets $$(1 - \alpha(u, v)) Ln[G(u, v)] = Ln[K_D] + Ln[S\{F(u, v)\}]. \tag{13}$$

Solving for $\alpha(u, v)$, $$\alpha(u, v) = 1 - \frac{Ln[K_D] + Ln[S\{F(u, v)\}]}{Ln[G(u, v)]}. \tag{14}$$

This relation has two unknowns. A quantitative method for calculating $Ln[K_D]$ is discussed below. However, educated guesses have also proved adequate. The second unknown is the smoothed transform of the truth image. On the surface this appears to be a dead end. However, the PSDs of natural images are similar. Therefore, instead of using the actual truth image, an image possessing similar spatial frequencies can be used.

If I apply the condition that $K_D$ is a real, positive scalar to insure $|D(u, v)| \leq 1$, then, from Equation 7

$$\frac{1}{K_D} \leq S\{|G(u, v)|^\alpha\} \tag{15}$$

where the noise term $W(u, v)$ is included with $G(u, v)$. To satisfy this condition, I set $$\frac{1}{K_D} = \text{Max}[S\{|G(u, v)|^\alpha\}] \tag{16}$$

where Max[...] returns the maximum value of the function. Taking the natural logarithm of each side produces $$LnK_D \approx -\alpha Ln[\text{Max}(S\{|G(u, v)|\})]. \tag{17}$$

This expression can be substituted into Equation 14. Solving for $\alpha(u, v)$ results in $$\alpha(u, v) = \frac{Ln[S\{F(u, v)\}] - Ln[S\{G(u, v)\}]}{Ln[\text{Max}(S\{|G(u, v)|\})] - Ln[S\{G(u, v)\}]}. \tag{18}$$

A frequency-dependent alpha could have several advantages. The power law is only applied to the portions of the frequency spectrum that needs to be restored. Thus, for example, low spatial frequency content of the image may be preserved, higher frequency content is enhanced, while noise at the highest frequencies is not amplified. A second advantage is that different regions of the frequency spectrum may require different $\alpha(u, v)$ values to achieve optimum restoration.

The utilization of a frequency-dependent $\alpha(u, v)$ provides a method to estimate the frequency-independent α as well. The value can be chosen to be the average value of the frequency-dependent α in the region of interest. It would save processing time when applied, and could substitute for user input in an automated process.

OPERATION—THE EXTRACTION PROCESS

Frequency-Independent Alpha

Although this approach is the same for one-dimensional data, I will use images to demonstrate the technique. The following is by no means the only such approach, as many different deconvolution algorithms and procedures can be used. Aside from the first step, the order is not critical. The first step is to perform a Fourier transform on the image which produces an image with complex values. The phase of the image is removed by multiplying the image by its complex conjugate, i.e. taking the magnitude. This preserves all the frequency content of the image, but discards all the positional information. (This explains why the PSF falls at the center of the image following the inverse transform.)

Next a power law is applied to the image. As stated above, $\alpha$ lies between 0 and 1, and is generally chosen to be 0.5. After the deconvolution algorithm is run, a judgement is made concerning the success. If the algorithm did not clean the image as effectively as desired, then the parameter was set too low. If the algorithm worked too well, overcompensating for edges and contrast, the parameter was set too high. The $\alpha$ value generally lies in the 0.3 to 0.7 range. Variations lower than ±0.05 do not visually alter the image much. Therefore, only a few guesses are necessary.

The smoothing function is applied so the frequency spectrum of the image more closely resembles the transfer function $D(u, v)$. Although there are many ways to achieve this, I will describe the two most common methods. The first is to directly apply a smoothing function, such as a median filter, to $|G(u, v)|^\alpha$. The risk is that there may be sharp peaks or valleys in the spectrum. When averaging occurs, these extremes will be dulled. The corresponding frequencies will not get the desired amount of enhancement.

The second approach is to apply an inverse Fourier transform to $|G(u, v)|^\alpha$ to bring it back into image space. With the phase information lost, the result will only contain large values in the center of the image. (It may be necessary to swap the quadrants after application of the inverse Fourier transform.) The result contains an extracted PSF for the image, surrounded by random noise. In order for a deconvolution process to function properly, the noise should be removed. My approach has been to measure the maximum value of the noise a significant distance away from the PSF. The value is subtracted from the image which is then converted to a format that does not permit negative values. All the noise will be converted to zeroes, cleaning the PSF. This procedure has the same effect of smoothing the image in Fourier space, but preserves the extremes better. The PSF is transformed back into Fourier space to serve as $D(u, v)$ in the deconvolution algorithms.

This signal restoration process is outlined in the flowchart in FIG. 1.

Frequency-Dependent Alpha

The procedure for determining a frequency-dependent $\alpha(u, v)$ is still being investigated. This function is determined from Equation 14. Owing to the restrictions placed on $\alpha$ in previous sections, all values below zero are set to zero, and all values above one are set to one.

The optimum choice for $S\{F(u, v)\}$ would be data taken through the same camera without aberrations. If this is not a possibility, then one can use data from similar systems, data that is representative of what one expects, or synthetic data, possibly modeled for that particular system.

If the processing program has the ability, $\alpha(u, v)$ is placed directly into Equation 12. If not, then $$D(u, v) = K_D exp[\alpha(u, v) Ln(S\{|G(u, v) - W(u, v)|\})] \quad (19)$$

serves as an equivalent relation. The derived filter function can be cleaned using the same methods described previously.

EXAMPLES

As mentioned, this process has worked well on all classes of images and one-dimensional data. In this section, I will show examples of the technique.

Figure 2A:
FIG. 2A is an image of the planet Saturn, taken by the Hubble telescope.
Figure 2B:
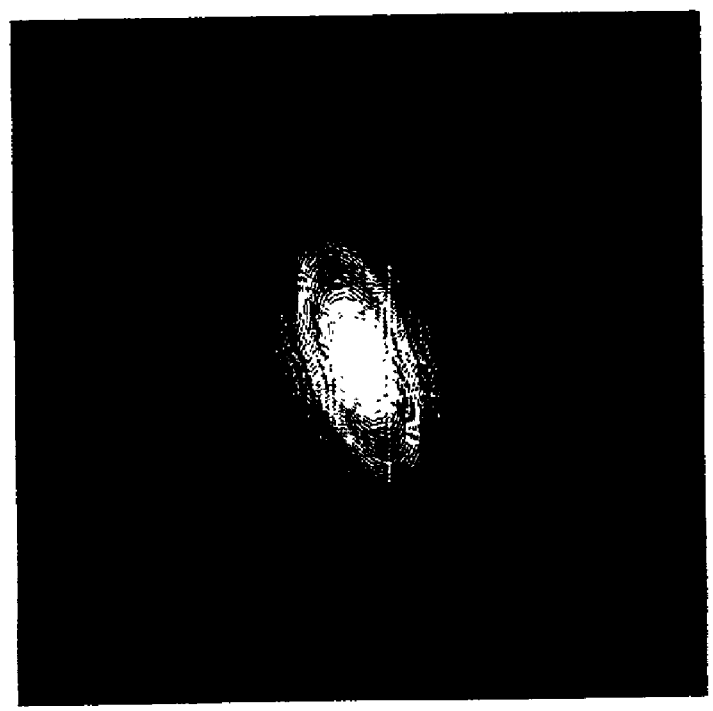
FIG. 2B is the Fourier transform of the image.

The first example, shown in FIG. 2, demonstrates the most basic process from start to finish. An image of Saturn is shown (FIG. 2A) that was taken by the Hubble telescope before the optical correction took place in late 1993. [14] First, a Fourier transform is applied to the image, shown in FIG. 2B. The phase information is discarded and a power law is applied to the image. (In this case, $\alpha=0.5$.) FIG. 2C shows the result of application of a smoothing operator. Now this image can be used for $D(u, v)$ in Equation 4 to deconvolve the image. FIG. 2E is the inverse transform of the previous image, also known as the PSF. The result of the deconvolution applied to the original image using the extracted PSF is shown in FIG. 2D.

Figure 3A:
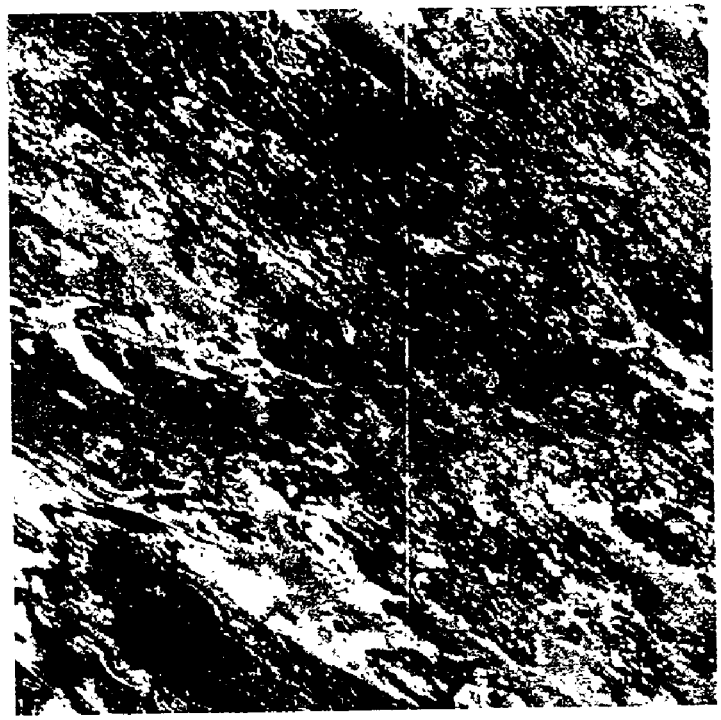
FIG. 3A was taken from the space probe Galileo of the surface of the moon Io of Jupiter.

The second example, shown in FIG. 3A, is an image of the surface of the moon Io of Jupiter taken from the space probe Galileo. Although the image already exhibits good resolution, the application of SeDDaRA, shown in FIG. 3B, brings out more detail. This detail may be recovered by standard means, such as applying an edge filter. However, this approach can only be described as an image enhancement technique, amplifying spatial frequencies to improve the image visually. SeDDaRA, however, is a true image restoration technique, restoring frequencies that were degraded by system optics and electronics. There is less danger of introducing features not present in the original image.

Figure 4A:
FIG. 4A was a photograph taken by a standard camera and digitized.
Figure 4B:
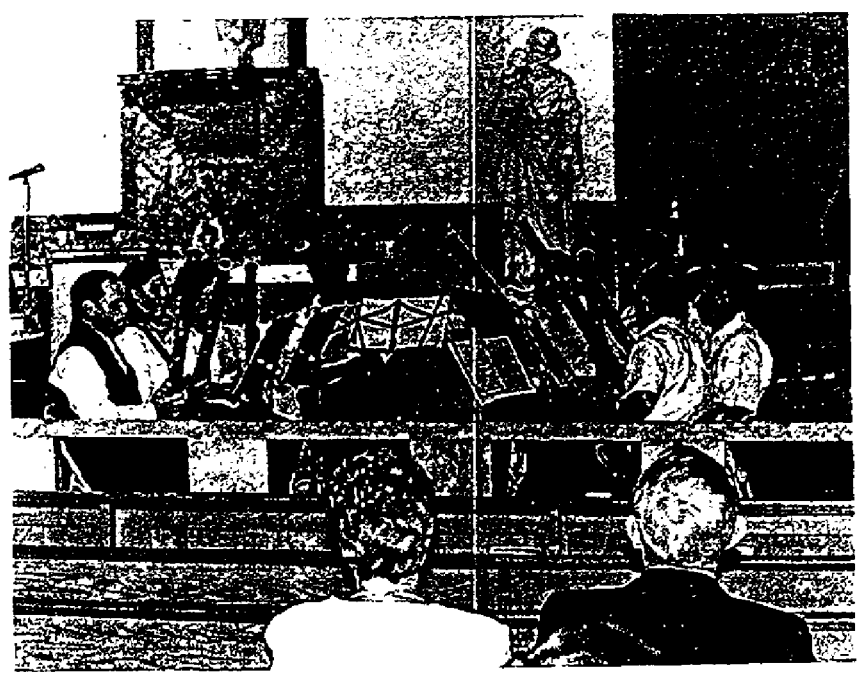
FIG. 4B is the restoration of the image using the SeDDaRA process.

FIG. 4A shows an image of a bassoon octet taken with a standard camera and digitized. There was some initial blur stemming from the camera and further blur introduced by the digitization process. The image was restored using the SeDDaRA algorithm (FIG. 4B). Although similar results may have been achieved using edge enhancing filters, application of this process removes the actual blur as opposed to compensating for it.

Figure 5A:
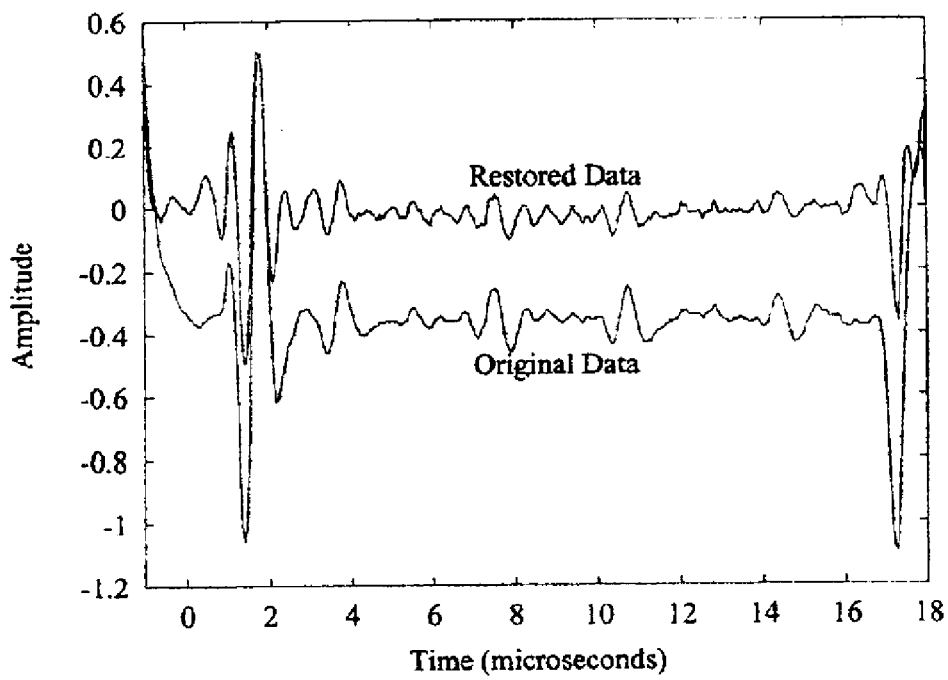
FIG. 5A shows an ultrasound waveform that traveled through a centimeter of air and its restoration.
Figure 5B:
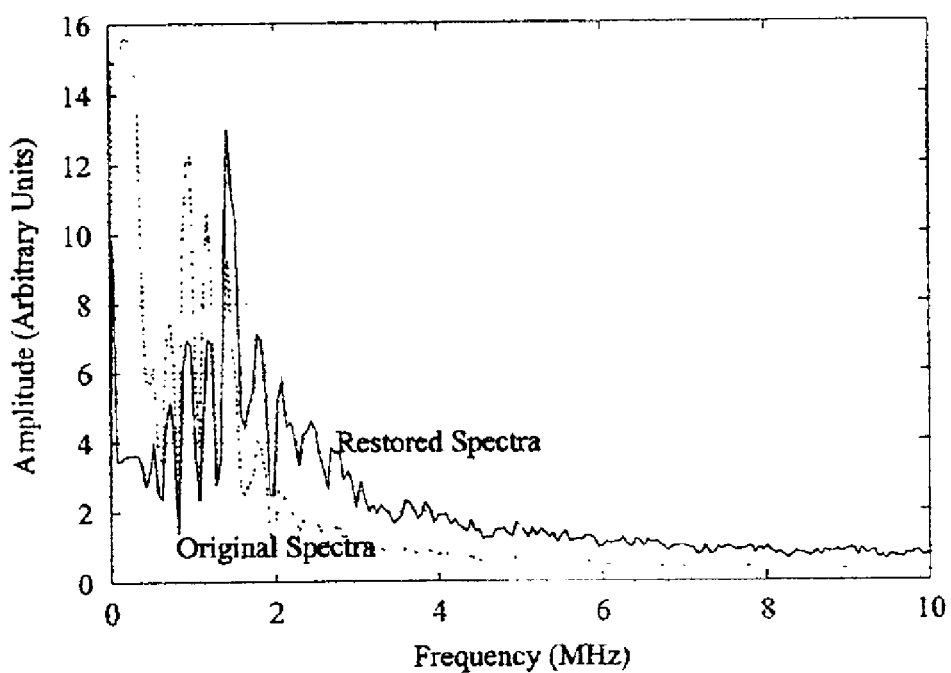
FIG. 5B shows the frequency spectra of the two waves.

FIG. 5A displays a original and restored ultrasound waveform that has traveled through air for about a centimeter. [16] In this frequency range, higher frequencies are greatly attenuated. Using Equation 18 and a reference waveform, the frequency-dependent alpha was extracted from the image. The PSF was created and inserted into the deconvolution algorithm. The restored waveform exhibits additional peaks and features that had been attenuated by the air. The frequency spectra are shown in FIG. 5B.

Potential Applications

Imaging

A primary advantage of this algorithm is that it can be used on a large range of images. Old photographs can be digitized, restored, and reprinted on photograph-quality paper. Photo processing can provide the de-blurring as an option to regular customers. In addition, any blur created by the digitization process will also be removed.

Space and aerial imagery can be enhanced for contrast and improved resolution. Engineers may choose sturdier optical systems instead of optimum systems with the advanced knowledge that any degradations can be removed. Degradations caused by air turbulence, for either a telescope looking up or a satellite looking down, can produce motion blurs that change on a frame-to-frame basis. This process is so quick that it may be applied specifically to each image, removing both the optics degradation and the motion blur function, in near-real time. Images from space probes could also be enhanced for better resolution or to diminish aberrations.

This process can be applied to non-optical two-dimensional images such as medical ultrasound and CAT scans. It also can be included as an option into thermography, X-ray systems, and microwave imaging systems. Essentially, SeDDaRA can be applied to any image system in which an impulse response is spread over several pixels.

Signal Processing

There are many cases where signals, electric or otherwise, suffer degradation from various sources. This algorithm has potential to improve signal reception for a wide variety of instrumentation. Frequencies, particularly those at the higher end of the desired spectrum, can be enhanced to give a received signal that is closer to the original.

For research, the algorithm could be embedded into digital oscilloscopes and other meters alongside more standard analysis features. The process-could be potentially be performed in near real-time or on 'snapshots' of signals. The algorithm can be added into laboratory software packages.

Communications can be enhanced in at least two ways. Signals degraded by long-distance communications can be recovered. Also, a signal can be intentionally compressed using a known $\alpha$. This compression would allow information to be sent faster. The signal is then deconvolved upon reception.

Sound Recording

This process can be used to optimize sound recording and playback systems. Blind deconvolution processing can restore acoustic frequencies that have been degraded by the sound recording and playback systems.

There is also potential for restoring data by intentionally degrading the data a second time. For example, a bassoonist is making a recording in a small room. The sound is converted to an electrical signal by the microphone. That electric signal is converted to information on a magnetic tape. For playback, the information on the magnetic tape is converted back to an electric signal. The signal is amplified and transformed back into a sound wave by the speaker system. The transformation of the energy puts a certain level of degradation into the signal, depending on the quality of the system.

To remove the degradation, the bassoonist can play the recording through the speaker system, and record it a second time through the microphone. The second recording will have twice the degradation as the first. As stated earlier, the algorithm can compare a 'truth' signal to a degraded one to find the degradation. The important aspect is that there is a difference of one degradation between the images. Therefore, by comparing a signal with one level of degradation to a signal that has twice the degradation, the form of the degradation can be removed using the same process outlined above. Using a deconvolution process, the degradation is then removed from the first recorded signal.

SeDDaRA may have commercial application in the recording industry. To date, sound systems improve their quality by developing better electronics to reduce the degradations. Through signal processing, future systems can remove any remaining degradations. One can foresee having selections of whether the home sound system should replicate a chamber room or a symphony hall sound, with the processing taking place inside the stereo system.

Embedded Electronics

Computer processors are continually being built faster, cheaper, smaller, and more energy efficient. Specific processors are being manufactured for digital phones. The sound quality of the phone can be enhanced by embedding the algorithm into the phone to correct for degradations that occur in the microphone, transmitter, receiver, and speaker. Processors could eventually find their way into hearing aids. This code can be implemented, either as software or hardware, into the hearing aid to correct for the narrow reception cone and system electronics. With a fast enough processor, the person would not be able to sense the time difference.

Conclusions, Ramifications, and Scope

The SeDDaRA process has several unique characteristics that are not found in current signal processing algorithms. At the core of the process, the application of this method extracts a reasonably good approximation for the degradation of a signal in a comparatively short amount of time. This algorithm is easy to implement, and can be inserted into existing signal processing packages without much difficulty. As demonstrated, the method works well on a wide variety of signal types, including imagery, acoustic waveforms, and any signal that suffers from significant low-pass filtering. All this is accomplished without direct information about the type of aberration, or the severity.

Potential commercial applications include image processing, for both research-based and consumer-based imagery. Aging photographs and movies may be restored and preserved digitally, or reprinted. Non-optical images such as medical ultrasound scans and X-rays scan can also be improved. This technique can be a valuable research tool to recover the full bandwidth of a signal, preserving critical high-frequency data. SeDDaRA may find application in recording studios and home sound systems to counteract effects created by room acoustics, and enhance the quality of the reproduction. With the advent of small powerful processors, this algorithm may be embedded into personal devices such as hearing aids, and cell phones to enhance performance.

References

[1] A. K. Jain, "Fundamentals of digital image processing," Prentice-Hall, Englewood Cliffs, N.J. 07632, 1989.

[2] M. I. Sezan, "Survey of recent developments in digital image restoration," Optical Engineering, 29(5), 393–404 (1990).

[3] B. Jähne, "Digital Image Processing," Springer-Verlag, Berlin, Germany, 1997.

[4] N. F. Law and D. T. Nguyen, "Multiple frame projection based blind deconvolution," Electronics Letters 31(20), 1733–1734 (1995).

[5] S. Barraza-Felix and B. R. Frieden, "Regularization of the image division approach to blind deconvolution," Applied Optics 38(11), 2232–2239 (1999).

[6] O. Shalvi and E. Weinstein, "Super-exponential methods for blind deconvolution," IEEE Transactions on Information Theory 39(2), 504–519 (1993).

[7] B. L. Satherly, and P. J. Bones, "Zero tracks for blind deconvolution of blurred ensembles," Applied Optics 33(11), 2197–2205 (1994).

[8] Y. Yitzhaky, R. Milberg, S. Yohaev, and N. S. Kopeika "Comparison of direct blind deconvolution methods for motion-blurred images," Applied Optics 38(20), 4325–4332 (1999).

[9] G. Arfken, "Mathematical Methods for Physicists", Academic Press, San Diego, Calif. 92101, 1985.

[10] N. Wiener, "The Extrapolation, Interpolation, and Smoothing of Stationary Time Series with Engineering Applications," Wiley, New York, 1949.

[11] C. W. Helstrom, "Image restoration by the method of least-squares," Journal of the Optical Society of America 57, 297–303 (1967).

[12] D. Slepian, "Linear least-squares filtering of distorted images," Journal of the Optical Society of America 57, 918–922 (1998).

[13] Y. Yitzhaky, I. Mor, A. Lantzinan, and N. S. Kopeika "Direct method for restoration of motion-blurred images," Journal of the Optical Society of America A 15(6), 1512–1519 (1998).

[14] Image courtesy of R. J. Hanisch, Space Telescope Science Institute. STScI/NASA.

[15] M. J. E. Golay, "Point array having compact, non-redundant autocorrelations," Journal of the Optical Society of America 61, 272–273 (1971).

[16] J. N. Caron, Y. Yang, J. B. Mehl, and K. V. Steiner, "Gas-coupled laser acoustic detection for ultrasound inspection of composite materials," *Materials Evaluation*, 58(5), 667–671, 2000.

FULL DESCRIPTION OF FIGURES

FIG. 1: This is a flowchart showing the primary steps for the extraction of the filter function and the deconvolution of an image.

FIG. 2: This series of images demonstrates the most basic process from start to finish. An image of Saturn (FIG. 2A) is shown that was taken by the Hubble telescope before the optical correction took place in late 1993. The first step is to take the Fourier transform of the image (FIG. 2B). The phase information is discarded and a power law using $\alpha=0.5$ is applied to the image. A smoothing filter is applied to this result (FIG. 2C). Now this image can be used for D(u, v) in Equation 4 to deconvolve the image. The deconvolution is shown in FIG. 2D. FIG. 2E shows an enlarged view of the Fourier transform of D(u, v). also referred to as the point spread function.

Figure 3B:
FIG. 3B shows the restoration result after applying the algorithm with a frequency-dependent $\alpha$.

FIG. 3: FIG. 3A was taken from the space probe Galileo of the surface of the moon Io of Jupiter. Although the image already exhibits a fair amount of high resolution, application of this process brings out more detail. FIG. 3B shows the restoration result after applying the algorithm with a frequency-dependent $\alpha$.

FIG. 4: This image (FIG. 4A) was photographed using a standard camera and digitized. The resulting blur stems from both the original photograph and from the digitization process. A single application of the process (FIG. 4B) removes both blurs in a single iteration.

FIG. 5: FIG. 5A is an ultrasound waveform that traveled through a centimeter of air. In this frequency range, the higher frequencies are strongly attenuated by air. The frequency-dependent alpha function was determined using Equation 18, producing an appropriate point spread function. The data was deconvolved using the extracted PSF, also shown in FIG. 5A. The red line is the original ultrasound wave and the green line is the deconvolution of the waveform. FIG. 5B shows the frequency spectra of the two waves. Note the recovered peaks in the restored waveform and the improved higher frequency response.

What is claimed as new and desired to be secured by Letters Patent of the United States is:

1. A non-iterative method for identifying signal degradation comprising the following steps:

a) applying a transform to the signal, in part or whole, to represent said signal as a frequency spectrum, said frequency having phase information;

b) applying a power law to the result of step (a) to form a filter function;

whereby the filter function or inverse transform of said filter function is used to identify system degradation.

2. The method of claim 1, further including the step of discarding said phase information of said frequency spectrum.

3. The method of claim 1, further including the step of applying a smoothing function.

4. The method of claim 2, further including the step of applying a smoothing function.

5. The method of claim 4, wherein the order in which the claimed steps are performed is changed.

6. The method of claim 1, further comprising the step of using said filter function or inverse transform of said filter function to remove aberrations, improve the quality, or alter the characteristics of said signal.

7. The method of claim 1, further including the step of defining the value of said power law to be a constant of frequency, and determining the value of said power law by calculation, estimate, or guess.

8. The method of claim 1, further including the step of defining the power law to be dependent on frequency, and determining the value of said power law by calculation, estimate, or guess.

9. A non-iterative method for identifying signal degradation comprising the following steps:

a) applying a transform to the signal, in part or whole, to represent said signal as a frequency spectrum, said frequency having phase information;

b) defining a power law to be dependent on frequency, and determining the value of said power law through comparison of said signal with a synthetic or empirical frequency spectrum representative of the desired result; and c) applying said Dower law to the result of step (a) to form a filter function;

whereby the filter function or inverse transform of said filter function is used to identify system degradation wherein said determining step comprises determining said power law.

10. The method of claim 1, wherein said applying step includes applying said transform to a multi-dimensional image or series of images.

11. The method of claim 1, further comprising using a data processor to carry out the previously claimed steps.

12. The method of claims 1, further comprising using a series of electronic circuits to carry out the previously claimed steps.

* * * * *